UNITED STATES PATENT OFFICE.

LEONARD PHILIP WILSON, OF COVENTRY, ENGLAND, ASSIGNOR TO SAMUEL COURTAULD & COMPANY LIMITED, OF LONDON, ENGLAND.

MANUFACTURE OF THREADS, FILAMENTS, STRIPS, AND FILMS OF CELLULOSE.

970,589.     Specification of Letters Patent.     Patented Sept. 20, 1910.

No Drawing.     Application filed April 11, 1908. Serial No. 426,519.

*To all whom it may concern:*

Be it known that I, LEONARD PHILIP WILSON, a subject of the King of Great Britain and Ireland, of Oakland, Station street east, Coventry, in the county of Warwick, England, chemist, have invented new and useful Improvements in Connection with the Manufacture of Threads, Filaments, Strips, and Films of Cellulose, of which the following is a specification.

This invention relates to the manufacture of threads, filaments, strips, or films, of cellulose by projecting viscose from suitably shaped orifices into baths, which cause setting, and formation of the viscose into cellulose, and the chief object of this invention is to make a product which is more pliable, and generally of better quality than that hitherto produced.

According to this invention there is employed in the bath an organic substance, or organic compound, which, in aqueous solution, will have a setting action on the viscose, preferably a coagulating action, without, in itself, causing decomposition of the viscose into cellulose, suitable organic substances, or compounds, being glucose, or other sugar, glycerin, or other alcohol, or a fatty acid, such as acetic acid, or a mixture of two, or more, of them, in addition to the usual constituent, or constituents, of the bath, such as a mineral acid, or a mixture of mineral acids, (for example sulfuric, hydrochloric, or phosphoric, acids), with, or without, a salt. In the claims when organic matter is referred to, it means organic matter of the character aforesaid. When a salt is used in the bath, it is preferred to employ ammonium-sulfate, or magnesium-sulfate, but the invention is not limited to the use of such salts.

The invention is not limited to particular proportions, as they can be varied in accordance with the temperature of the bath, the condition of the viscose, and the time of its immersion in the bath, and also with the conditions under which the spinning, or other manipulation, of the product is to be effected, but the following are examples of ingredients and proportions of the improved baths which may be employed. The parts are by weight.

Example 1: Ten parts of sulfuric acid ($H_2SO_4$) and thirty parts of glucose contained in one hundred parts of the bath.

Example 2: Nine parts of hydrochloric acid (HCl) and twenty parts of glycerin contained in one hundred parts of the bath.

Example 3: Eight parts of sulfuric acid ($H_2SO_4$), seventeen and a half parts of ammonium-sulfate and seven and a half parts of glucose in one hundred parts of the bath.

Example 4: Eight parts of sulfuric acid ($H_2SO_4$), six parts of magnesium sulfate and seven and a half parts of glucose in one hundred parts of the bath.

I have found that ammonium-sulfate is especially advantageous, but I may use other salt in place thereof, such, for example, as sodium-sulfate.

Having now particularly described and ascertained the nature of my said invention and in what manner the same is to be performed, I declare that what I claim is:—

1. In the manufacture of cellulose objects from viscose, the introduction of the latter in suitable form into a precipitating bath containing glucose.

2. In the manufacture of cellulose objects from viscose, the introduction of the latter in suitable form into a bath containing an organic setting agent for the viscose, together with a decomposing precipitant adapted to effect the decomposition of viscose into cellulose, substantially as described.

3. In the manufacture of cellulose objects from viscose, the introduction of the latter in suitable form into a bath containing as a viscose setting agent a sugar of the character described, together with a decomposing precipitant adapted to effect the decomposition of viscose into cellulose, substantially as described.

4. In the manufacture of cellulose objects from viscose, the introduction of the latter in suitable form into a bath containing, in aqueous solution, an organic setting agent for the viscose, together with a decomposing precipitant adapted to effect the decomposition of viscose into cellulose, substantially as described.

5. In the manufacture of cellulose objects from viscose the introduction of the latter in suitable form into a precipitating bath containing an acid, a salt and a sugar, such as glucose.

6. The described process of making threads of cellulose consisting in projecting viscose from suitably shaped orifices into a bath containing sulfuric acid, a sugar such as glucose and ammonium sulfate, substantially as described.

In testimony whereof I have signed my name to this specification in the presence of two subscribing witnesses.

LEONARD PHILIP WILSON.

Witnesses:
JOHN RAVEN,
ARTHUR CHARLES RANSHALL HAWTHORNE.